United States Patent
Tee et al.

(10) Patent No.: US 9,020,554 B2
(45) Date of Patent: Apr. 28, 2015

(54) SYSTEM AND METHOD FOR SUPPORTING MULTI-USER ANTENNA BEAMFORMING IN A CELLULAR NETWORK

(75) Inventors: Lai King Tee, Dallas, TX (US); Jun Li, Richardson, TX (US); Aaron Callard, Ottawa (CA); Jianglei Ma, Kanata (CA)

(73) Assignee: Apple Inc., Cupertino, CA (US)

( * ) Notice: Subject to any disclaimer, the term of this patent is extended or adjusted under 35 U.S.C. 154(b) by 1157 days.

(21) Appl. No.: 12/997,061

(22) PCT Filed: Jun. 24, 2009

(86) PCT No.: PCT/US2009/003746
§ 371 (c)(1),
(2), (4) Date: Dec. 9, 2010

(87) PCT Pub. No.: WO2009/157993
PCT Pub. Date: Dec. 30, 2009

(65) Prior Publication Data
US 2011/0081943 A1 Apr. 7, 2011

Related U.S. Application Data

(60) Provisional application No. 61/075,215, filed on Jun. 24, 2008.

(51) Int. Cl.
*H04B 7/00* (2006.01)
*H04W 52/58* (2009.01)
(Continued)

(52) U.S. Cl.
CPC ............ *H04W 52/58* (2013.01); *H04W 52/346* (2013.01); *H04W 52/42* (2013.01); *H04W 72/046* (2013.01)

(58) Field of Classification Search
USPC ..................... 455/69, 522; 370/318
See application file for complete search history.

(56) References Cited

U.S. PATENT DOCUMENTS 7,197,084 B2 3/2007 Ketchum et al.
7,649,953 B2 1/2010 Bauch
(Continued)

FOREIGN PATENT DOCUMENTS

CN 1823278 A 8/2006
JP 2003018053 A 1/2003
(Continued)

OTHER PUBLICATIONS

Office Action and translation thereof for Japanese Patent Application No. 2011-514632, Sep. 24, 2013, pp. 1-14.
(Continued)

*Primary Examiner* — Raymond Dean
(74) *Attorney, Agent, or Firm* — Meyertons, Hood, Kivlin, Kowert & Goetzel, P.C.

(57) ABSTRACT

The present invention is a method and system for supporting a beamforming antenna system in a multiple user mobile broadband communication network including a process for setting and adjusting the magnitude and phase of the signal to user equipment from each antenna. Namely, the present invention supports the communication of power signal values or levels to user equipment in a manner that keeps pace with the rapid variations of the power levels that occur in the dynamic scheduling of transmissions on the cell site. The present invention satisfies this need for an improved signal strength signaling to user equipment for the situation where multiple users are located on the cell site.

16 Claims, 2 Drawing Sheets

(51) Int. Cl.
*H04W 52/34* (2009.01)
*H04W 52/42* (2009.01)
*H04W 72/04* (2009.01)

(56) References Cited

U.S. PATENT DOCUMENTS

| | | | |
|---|---|---|---|
| 8,295,868 B2 * | 10/2012 | Zhang et al. | 455/515 |
| 2003/0228865 A1 | 12/2003 | Terry | |
| 2007/0087695 A1 | 4/2007 | Cohen et al. | |
| 2007/0270155 A1 | 11/2007 | Nelson et al. | |
| 2008/0113672 A1 | 5/2008 | Karr et al. | |
| 2008/0144493 A1 | 6/2008 | Yeh | |
| 2009/0245410 A1 * | 10/2009 | Lee et al. | 375/267 |
| 2009/0318183 A1 * | 12/2009 | Hugl et al. | 455/522 |
| 2011/0092241 A1 | 4/2011 | Kawai et al. | |

FOREIGN PATENT DOCUMENTS

| | | | |
|---|---|---|---|
| JP | 2008136217 A | 6/2008 | |
| WO | 2007/024935 A2 | 3/2007 | |

OTHER PUBLICATIONS

First Office Action and Search Report in Chinese Application No. 200980124037.2, issued Jan. 4, 2013, pp. 1-9.

International Searching Authority: Notification of Transmittal of the International Search Report, Written Opinion of Int'l Searching Authority, or the Declaration dated Nov. 19, 2009.

International Searching Authority: Written Opinion of the International Searching Authority dated Nov. 19, 2009.

International Searching Authority: International Search Report dated Nov. 19, 2009.

Office Action from Korean Patent Application No. 10-2011-7001703, mailed Mar. 5, 2014, English and Korean versions, pp. 1-16.

3GPP TSG-RAN WG1 #53, Remaining Details on Control Signaling for the MU-MIMO Transmission Mode, Ericsson, May 9, 2008, pp. 1-2.

* cited by examiner

SYSTEM AND METHOD FOR SUPPORTING MULTI-USER ANTENNA BEAMFORMING IN A CELLULAR NETWORK

RELATED APPLICATION DATA

This application is related to Provisional Patent Application Ser. No. 61/075,215 filed on Jun. 24, 2008, and priority is claimed for this earlier filing under 35 U.S.C. §119(e). The Provisional Patent Application is incorporated by reference into this utility patent application.

TECHNICAL FIELD OF THE INVENTION

The invention relates supporting the signal power variations on spatial beams for multiple users within a cell segment.

BACKGROUND OF THE INVENTION

There is an increasing demand on mobile wireless operators to provide voice and high-speed data services, and at the same time, these operators want to support more users per basestation to reduce overall network costs and make the services affordable to subscribers. As a result, wireless systems that enable higher data rates and higher capacities are needed. The available spectrum for wireless services is limited, however, and the prior attempts to increase traffic within a fixed bandwidth have increased interference in the system and degraded signal quality.

Wireless communications networks are typically divided into cells, with each of the cells further divided into cell sectors. A base station is provided in each cell to enable wireless communications with mobile stations located within the cell. One problem exists when prior art omni-directional antennas are used at the basestation because the transmission/reception of each user's signal becomes a source of interference to other users located in the same cell location on the network, making the overall system interference limited. Such an omni-directional antenna is shown in FIG. 1(a).

In these traditional omni-directional antenna cellular network systems, the base station has no information on the position of the mobile units within the cell and radiates the signal in all directions within the cell in order to provide radio coverage. This results in wasting power on transmissions when there are no mobile units to reach, in addition to causing interference for adjacent cells using the same frequency, so called co-channel cells. Likewise, in reception, the antenna receives signals coming from all directions including noise and interference.

An effective way to increase efficiency of bandwidth usage and reduce this type of interference is to use multiple input-multiple output (MIMO) technology that supports multiple antennas at the transmitter and receiver. For a multiple antenna broadcast channel, such as the downlink on a cellular network, transmit/receive strategies have been developed to maximize the downlink throughput by splitting up the cell into multiple sectors and using sectorized antennas to simultaneously communicate with multiple users. Such sectorized antenna technology offers a significantly improved solution to reduce interference levels and improve the system capacity.

The sectorized antenna system is characterized by a centralized transmitter (cell site/tower) that simultaneously communicates with multiple receivers (user equipment, cell phone, etc.) that are involved in the communication session. With this technology, each user's signal is transmitted and received by the basestation only in the direction of that particular user. This allows the system to significantly reduce the overall interference in the system. A sectorized antenna system, as shown in FIG. 1(b), consists of an array of antennas that direct different transmission/reception beams toward users located in the coverage area of the sector of the cell.

To improve the performance of a sectorized cell sector, schemes have been implemented using orthogonal frequency domain multiple access (OFDMA) systems, which are also called Space-Division Multiple Access (SDMA) systems. In these systems, mobile stations can communicate with the base station using one or more of these spatial beams. This method of orthogonally directing transmissions and reception of signals, called beamforming, is made possible through advanced signal processing at the base station.

A beamforming scheme is defined by the formation of multiple spatial beams within a cell sector to divide the cell sector into different coverage areas. The radiation pattern of the base station, both in transmission and reception, is adapted to each user to obtain highest gain in the direction of that user. By using sectorized antenna technology and by leveraging the spatial location and channel characteristics of mobile units within the cell, communication techniques called space-division multiple access (SDMA) have been developed for enhancing performance. Space-Division Multiple Access (SDMA) techniques essentially creates multiple, uncorrelated spatial pipes transmitting simultaneously through beamforming and/or precoding, by which it is able to offer superior performance in multiple access radio communication systems.

One type of beamforming scheme is an adaptive beamforming scheme that dynamically directs beams toward a location of a mobile station. Such an adaptive beamforming scheme requires mobility tracking in which locations and spatial characteristics of mobile stations are tracked for the purpose of producing the adaptive beams. Depending on location and spatial characteristics, each user's signal is multiplied by complex weightings that adjust the magnitude and phase of the signal to and from each antenna. This causes the output from the array of sectorized antennas to form a transmit/receive beam in the desired direction and minimizes the output in other directions, which can be seen graphically in FIG. 2. Precoding is an implementation of beamforming that uses predetermined codewords, where each codeword is a set of weights for the antenna elements.

To support communications to the user equipment, the user equipment will be instructed about the power signal values or signal levels that need to be set for transmissions to the user equipment, especially when multiple users are located on the cell site. In the prior art, the user equipment 205 and 210 is instructed as to the energy allocation per resource element (EPRE) power level by Radio Resource Control (RRC) signaling as shown in early releases of the 3GPP TS 36.213 standard. (e.g., TS 36.213 v8.3.0) But, due to the dynamic nature of scheduling, the RRC signaling of power levels has proven too slow to keep pace with the rapid variations in the power level that are encountered on the system. This problem leads to performance loss because users on the multiple user-MIMO system can be changed at a higher rate than the frequency of RRC signaling. Further, there are other disadvantages to using the RRC signaling to designate power levels to the user equipment, including increased scheduler complexity and the need for more RRC signaling of power levels.

Because the currently known methods of instructing the user equipment about the energy allocation per resource element (EPRE), which is the signal strength value or level for transmissions to the user equipment, are not fast enough to keep pace with the rapid variations of power levels that occur in the dynamic scheduling of transmissions on the cell site, there is a need for an improved signal strength or level signaling to user equipment, especially where multiple users that are located on the same cell site can be scheduled for transmission using the same channel resources. There is also a need for support of sectorized beamforming antenna systems in a multiple user mobile broadband communication network, including solving the above-identified problem.

The various components on the system may be called different names depending on the nomenclature used on any particular network configuration or communication system. For instance, "user equipment" encompasses PC's on a cabled network, as well as other types of equipment coupled by wireless connectivity directly to the cellular network as can be experienced by various makes and models of mobile terminals ("cell phones") having various features and functionality, such as Internet access, e-mail, messaging services, and the like.

Further, the words "receiver" and "transmitter" may be referred to as "access point" (AP), "basestation," and "user" depending on which direction the communication is being transmitted and received. For example, an access point AP or a basestation (eNodeB or eNB) is the transmitter and a user is the receiver for downlink environments, whereas an access point AP or a basestaion (eNodeB or eNB) is the receiver and a user is the transmitter for uplink environments. These terms (such as transmitter or receiver) are not meant to be restrictively defined, but could include various mobile communication units or transmission devices located on the network.

SUMMARY OF THE INVENTION

The present invention is a method and system for supporting a beamforming antenna system in a multiple user mobile broadband communication network including a process for setting and adjusting the magnitude and phase of the signal to user equipment from each antenna. Namely, the present invention supports the communication of power signal values or levels to user equipment in a manner that keeps pace with the rapid variations of the power levels that occur in the dynamic scheduling of transmissions on the cell site. The present invention satisfies this need for an improved signal strength signaling to user equipment for the situation where multiple users are located on the cell site.

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE PREFERRED EMBODIMENTS

Figure 1:
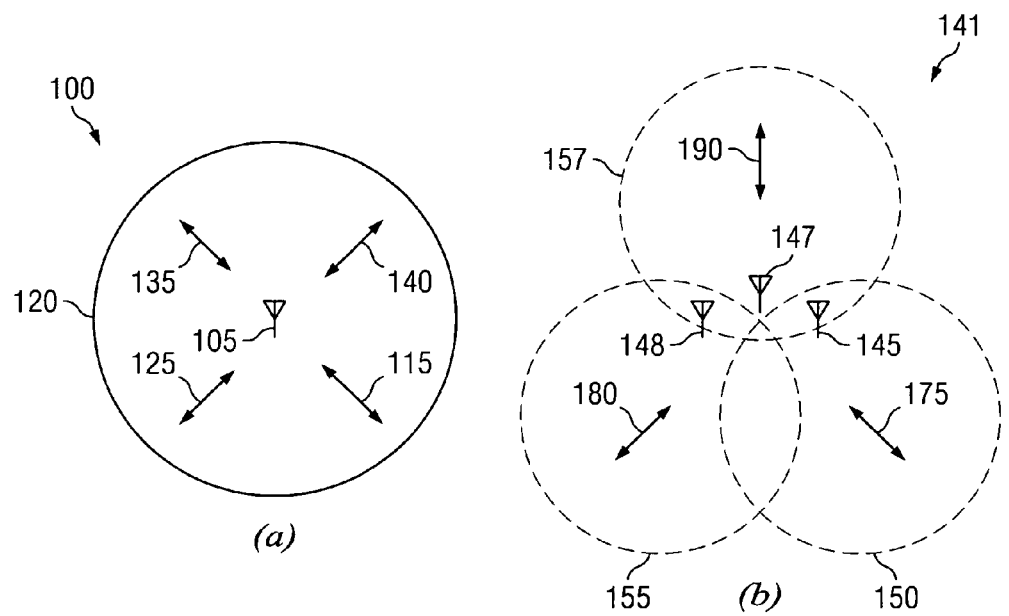
FIG. 1 is a graphical illustration of an omni-directional antenna (a) and a sectorized antenna (b)

In FIG. 1(a), the overall transmission architecture 100 of an omni-directional antenna 105 that transmits radially outward equally in various directions shown by arrows 125, 115, 135 and 140. The perimeter of the coverage area is shown by the area 120 for the transmission architecture 100. Improved efficiencies have been achieved by using the sectorized antenna architecture 141 shown in FIG. 1(b).

Multiple antennas 145, 147 and 148 are shown in the architecture 140, wherein each antenna is directed toward a different region of the cellular network shown by the directional transmission 175 for coverage area 150, transmission 190 for coverage area 157, and directional transmission 180 for coverage area 155. In this context, it is possible for system capacity to be improved by the sectorized architecture.

Figure 2:
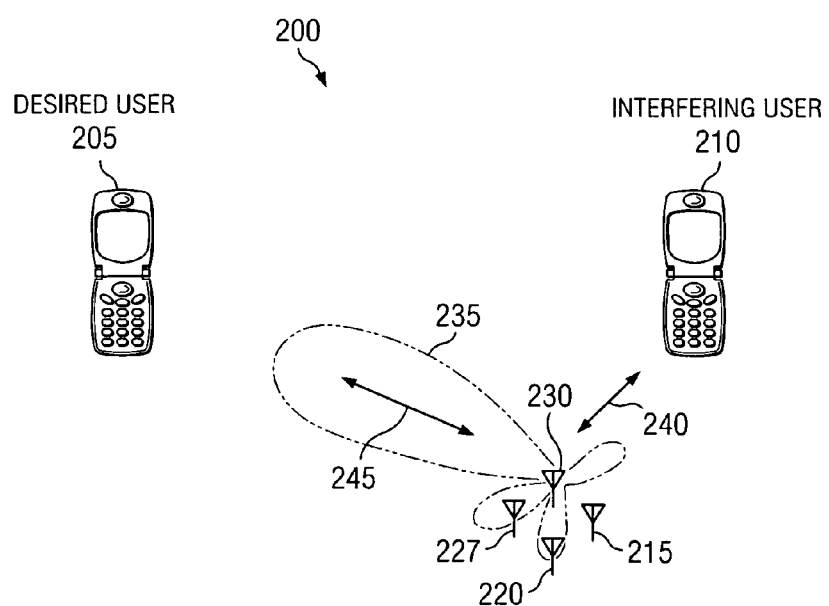
FIG. 2 is a graphical illustration of a weighted sectorized transmission beam directed to the desired user; and, FIG. 3 is a block diagram of exemplary components of a base station and mobile station.

By varying the strength of various transmission signals, additional efficiencies and reduced interferences can be achieved as shown in FIG. 2 for the sectorized architecture 200. Multiple antenna 215, 220, 227 and 230 direct transmissions (or receive transmissions) in the sectorized antenna architecture 200. A directional antenna beam 235 is formed by increasing the strength of that signal from antenna element 230. The desired user 205 is shown receiving a desired transmission 245 in high signal strength coverage area 235, which is a higher powered beam meant to be directed to that user 205. An interfering user 210 is shown with lower strength transmission signal 240, which reduces the interference encountered in the system related to that user 210.

In accordance with some preferred embodiments, an "opportunistic" space time multiple access (OSTMA) technique is provided for use in wireless communications networks. The OSTMA technique enables the formation of multiple spatial beams in a cell segment (cell or cell sector), where at least some of the multiple spatial beams of the cell segment are associated with different power levels to provide different coverage areas within the cell segment. A spatial beam (or more simply "beam") refers to a geographically distinct coverage region within a cell segment in which wireless communication between a base station and mobile station(s) can be performed.

The OSTMA scheme is provided for the forward wireless link from the base station to the mobile stations. In alternative embodiments, the OSTMA scheme can also be used for the reverse wireless link from the mobile station to the base station. The communication connection in which data flow from the base station to the mobile station is called the forward link (FL). Likewise, the communication connection in which data flow from the mobile station to the base station is called the reverse link (RL). Communication conditions are not always the same for both the FL and the RL. For example, a mobile station may be communicating with a serving base station which has a highly congestive RL traffic but a relatively open FL flow. The mobile station may need to adjust its RL connections because to stay with the same base station for both FL and the RL (if a more open RL connection is available from another base station) may not be the best use of communication resources.

Figure 3:
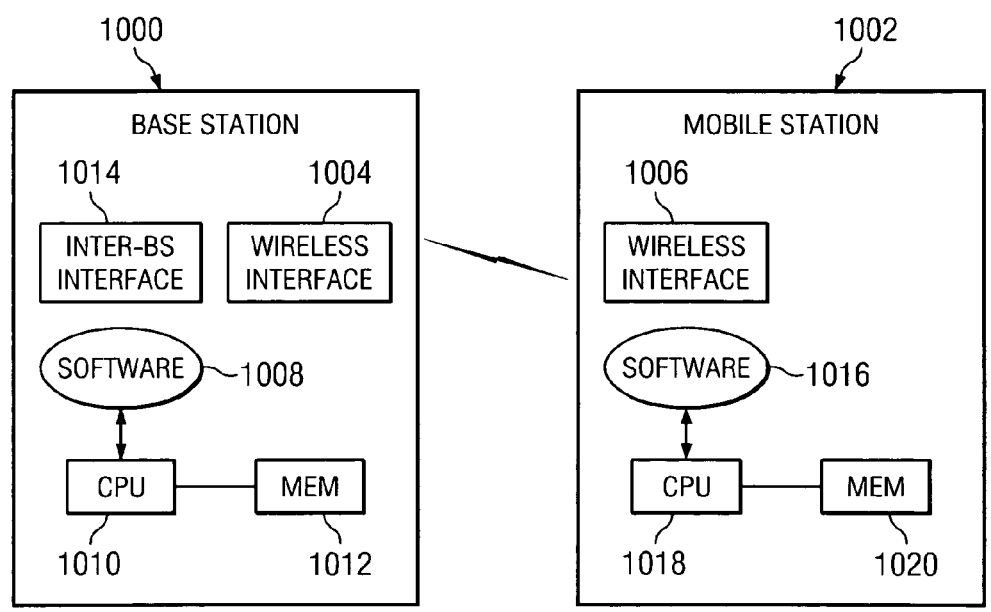

Exemplary components in the preferred embodiment include a base station 1000 and mobile station 1002 are depicted in FIG. 3. The base station 1000 includes a wireless interface 1004 to communicate wirelessly over a wireless link with a wireless interface 1006 in the mobile station 1002. The base station 1000 includes software 1008 that is executable on one or more central processing units (CPUs) 1010 in the base station 1000 to perform tasks of the base station. The CPU(s) 1010 is (are) connected to a memory 1012. The software 1008 can include a scheduler and other software modules. The base station 1000 also includes an inter-base station interface 1014 to communicate information with another base station, such as backhaul information and/or coordination information.

Similarly, the mobile station 1002 includes software 1016 executable on one or more CPUs 1018 connected to a memory 1020. The software 1016 is executable to perform tasks of the mobile station 1002. Instructions of such software (1008 and 1016) can be loaded for execution onto the CPUs or other types of processors. The processor can include a microprocessor, microcontroller, processor module or subsystem (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (ERPROMs) and flash memories; magnetic disks such as fixed, floppy and removable disks; other magnetic media including tape; and optical media such as compact disks (CDs) or digital video disks (DVDs).

When multiple users 205 and 210, such as shown on FIG. 2, are being serviced on the same cell site sector, the signal power from the transmission antenna 230 must be divided between those multiple users. User 205 or 210 in the multiple user-MIMO mode should expect that their EPRE power level can take one of several values depending on the number of multiple users simultaneously being serviced on that cell site sector.

In the prior art, the user equipment 205 and 210 is instructed as to the EPRE power level by Radio Resource Control (RRC) signaling as shown in early releases of the 3GPP TS 36.213 standard. (e.g., TS 36.213 v8.3.0) But, due to the dynamic nature of scheduling, the RRC signaling of power levels has proven too slow to keep pace with the rapid variations in the power level that are encountered on the system. This problem leads to performance loss because users on the multiple user-MIMO system can be changed at a higher rate than the frequency of RRC signaling. Further, there are other disadvantages to using the RRC signaling to designate power levels to the user equipment, including increased scheduler complexity and the need for more RRC signaling of power levels.

The present invention solves the problem associated with RRC signaling of power levels by providing power level information to the user equipment 205 or 210 through bits designated in the scheduling message for users in the multiple user-MIMO mode. The advantages of using the scheduling message to communicate the power level information, as opposed to the RRC signaling, include full scheduler flexibility, improved performance and reduced need for RRC signaling for a scaling factor update. Further, because the signal to noise ratio for multiple user-MIMO users tends to be quite high, the increased control channel overhead for including the power level information in the Grant message (as a percentage of the achievable throughput) will be quite small.

The present invention uses several bits in the scheduling message transmitted to users 205 and 210 (or mobile station 1002) from the basestation 1000. The scheduling Grant message can be described as it relates to the Physical Downlink Shared Channel (PDSCH) transmission modes identified in the signaling format for multiple user-MIMO transmissions. The present invention merges the multiple user-MIMO and closed-loop Rank-1 precoding transmission modes into a single designation mode with transmission antenna designation bits because the closed loop precoding transmission mode is a subset of the multiple user-MIMO mode. Namely, the invention allows for the dynamic switching between the multiple user-MIMO and closed loop Rank-1 and Rank-2 precoding transmissions through the designation bits in the scheduling message, without the need for higher layer RRC signaling that would be necessary in the prior art for changing from one transmission mode to another. By using designation bits in the scheduling message transmitted to users, the present invention combines the two separate transmission mode designations into a single transmission mode designation, which reduces the overhead of control messages and simplifies the transmission mode designations in the system.

In the present invention, when the eNodeB is transmitting to multiple user equipment, such as 205 and 210 in FIG. 2, the eNodeB must divide the power between the different user equipment. The amount of power division depends on the number of user equipment that must be served on the cell segment using the same channel resources. For instance, if two user equipment are being serviced, the power division to user equipment 205 would be designated by the precoding table [1 1 1 1]/sqrt (2) and to user equipment 210 would be designated by the precoding table [1 −1 1 −1]/sqrt (2), where 1/sqrt(2) is used as a scaling factor for the two precoders that reduce the power signals being transmitted to the respective user equipment. If a four transmitter antenna system is supported by the eNodeB, the precoder may scale the power level to user equipment 205 using the precoding table [1 1 1 1]/sqrt (N), while the other signals to other user equipment would be reduced by a proportional factor designated by a predetermined precoding table assigned for those other user equipment, for N users that are scheduled for the same channel resources.

In the present invention, the scaling factor is signaled to the user equipment using additional designation bits in a message sent to the user equipment. In one embodiment, additional bits can be added to a new format message (e.g. Format 1B) or designation bits can be re-interpreted from designation bits in an existing message format (e.g. Format 2 for users in a multiple user-MIMO Grant message). If only two transmitters are required because there are 1 to 2 users on the cell segment, only one additional designation bit in the format message will be needed. If four transmitters are required because there are up to four users on the cell segment, two additional designation bit in the format message will be needed.

When the user equipment 205 receives the bit designations in the format message, it calculates the scaling factor to be applied to the power level for that user equipment based on the number of transmitter antennas and users specified by the designation bits. The power scaling factors P_A and P_B can be determined by the user in that manner, and the power scaling factor can be used by the receiver to demodulate the received signal. The system dynamically adjusts the power of the transmission signal in a very rapid manner with the use of the designation bits, and the user uses the scaling factor to demodulate the signal at the receiver. The user equipment may calculate the scaling factor P_A and P_B using a predetermined scaling factor, such as $-10 \log_{10} N$, N=1, 2 for a 2 transmitter antenna bit designation using one bit or $-10 \log_{10} N$, N=1, 2, 3, 4 for a 4 transmitter antenna bit designation using two bits, or values from a precoding table. This embodiment can be used with the new format message (e.g. Format 1B) or designation bits can be re-interpreted from designation bits in an existing message format (e.g. Format 2 for users in a multiple user-MIMO Grant message). Alternatively, the designation bits can be used to look up the scaling factor from a pre-coding look-up table or other table resource on the system.

Alternatively, the bit designations in the format message may provide the actual scaling values, P_A and P_B, to the user equipment, which will use more bits than the prior designation method but will allow for faster protocol processing by eliminating a calculation of the P_A and P_B scaling values by the user equipment. The actual value of P_A and P_B scaling values can be specified in the designation bits, or representative of a predetermined factor defined by a table, or otherwise known in the system. For instance, the three bits designating P_A may define dB values to be applied to the power on the signal strength (e.g. dB=3, 2, 1, 0, −1, −2, −3, −6), the designation bits may define a table entry in a specified scaling table (e.g. three bits designates entries on a scaling or precoding table), or the scaling factors known to the system are specified by $P\_A=-10 \log_{10}N$, N=1, 2 for a 2 transmitter antenna bit designation or $P\_A=-10 \log_{10}N$, N=1, 2, 3, 4 for a 4 transmitter antenna bit designation. The power scaling factors P_A and P_B can be determined by the user in that manner, and the power scaling factor can be used by the receiver to demodulate the received signal. The system dynamically adjusts the power of the transmission signal in a very rapid manner with the use of the designation bits, and the user uses the scaling factor to demodulate the signal at the receiver. This embodiment can be used with the new format message (e.g. Format 1B) or designation bits can be re-interpreted from designation bits in an existing message format (e.g. Format 2 for users in a multiple user-MIMO Grant message).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for specifying a power scaling factor for a transmission signal from an access node to a receiver on a communication system that has at least two spatial beams providing coverage in a cell sector, the method comprising:
   by the access node,
      determining the power scaling factor to be applied to the transmission signal to the receiver, wherein the power scaling factor is determined based on a resource allocation on the cell sector and number of receivers that will be communicated to over the allocated resource, wherein the power scaling factor is calculated using:
         a formula $-10 \log_{10}N$, N=1, 2 for a 2 transmitter antenna, wherein a format message further includes an additional bit to specify a number of transmitters transmitting; or
         a formula $-10 \log_{10}N$, N=1, 2, 3, 4 for a 4 transmitter antenna, wherein the format message further includes an additional two bits to specify a number of transmitters transmitting;
      preparing the format message based on the power scaling factor determined by the access node, wherein the format message further includes designation bits specifying a transmission mode of a plurality of transmission modes, wherein the plurality of transmission modes comprises multiple user-MIMO, closed loop Rank-1, and closed loop Rank-2;
      transmitting the format message periodically over one or more spatial beam transmissions, wherein the format message includes information required for calculating; and
      dynamically adjusting power of the transmission signal to the receiver based on the power scaling factor.

2. The method of claim 1, wherein the access node comprises two transmitters, wherein the transmitters perform the transmitting.

3. The method of claim 1, wherein the access node comprises four transmitters, wherein the transmitters perform the transmitting.

4. A method for specifying a power scaling factor for a transmission signal from an access node to a receiver on a communication system that has at least two spatial beams providing coverage in a cell sector, the method comprising:
   by the access node,
      determining the power scaling factor to be applied to the transmission signal to the receiver, wherein the power scaling factor is a value adjustment to the transmission signal based on a resource allocation on the cell sector and number of receivers that will be communicated to over the allocated resource, wherein the power scaling factor is calculated using:
         a formula $-10 \log_{10}N$, N=1, 2 for a 2 transmitter antenna, wherein a format message further includes an additional bit to specify a number of transmitters transmitting; or
         a formula $-10 \log_{10}N$, N=1, 2, 3, 4 for a 4 transmitter antenna, wherein the format message further includes an additional two bits to specify a number of transmitters transmitting;
      preparing the format message based on the power scaling factor determined by the access node, wherein the format message includes designation bits specifying a transmission mode of a plurality of transmission modes, wherein the plurality of transmission modes comprises multiple user-MIMO, closed loop Rank-1, and closed loop Rank-2;
      transmitting the format message periodically over one or more spatial beam transmissions, wherein the format message includes information specifying value of the power scaling factor; and
      dynamically adjusting the power of the transmission signal to the receiver based on the power scaling factor.

5. The method of claim 4, wherein the format message further includes designation bits further specifying a dB rating to be applied to the transmission signal.

6. A transmission system that specifies a power scaling factor for a transmission signal from an access node to a receiver on a communication system that has at least two spatial beams providing coverage in a cell sector of a network, the system comprising:
   an access node, comprising:
      a processor configured to:
         determine the power scaling factor to be applied to a transmission beam to the receiver based on a resource allocation on the cell sector and number of receivers that will be communicated to over the allocated resource, wherein the power scaling factor is calculated using:
            a formula $-10 \log_{10}N$, N=1, 2 for a 2 transmitter antenna, wherein a format message further includes an additional bit to specify a number of transmitters transmitting; or
            a formula $-10 \log_{10}N$, N=1, 2, 3, 4 for a 4 transmitter antenna, wherein the format message further includes an additional two bits to specify a number of transmitters transmitting; and prepare the format message based on the power scaling factor, wherein the format message includes designation bits specifying a transmission mode of a plurality of transmission modes, wherein the plurality of transmission modes comprises multiple user-MIMO, closed loop Rank-1, and closed loop Rank-2; and a transmitter configured to transmit the format message periodically over one or more spatial beam transmissions, wherein the format message includes information required for calculating the power scaling factor;

wherein the access node is configured to dynamically adjust the power of the transmission signal to the receiver based on the power scaling factor without creating interference with other transmissions on the network.

7. The system of claim 6, wherein the transmitter is a first transmitter, wherein the access node further comprises a second transmitter.

8. The system of claim 6, wherein the transmitter is a first transmitter, wherein the access node further comprises an additional three transmitters.

9. A transmission system that specifies a power scaling factor for a transmission signal from an access node to a receiver on a communication system that has at least two spatial beams providing coverage in a cell sector of a network, the system comprising:
an access node, comprising:
a processor configured to:
determine the power scaling factor that is a value adjustment to be applied to a transmission signal to the receiver based on a resource allocation on the cell sector and number of receivers that will be communicated to over the allocated resource, wherein the power scaling factor is calculated using:
a formula $-10 \log_{10} N$, N=1, 2 for a 2 transmitter antenna, wherein a format message further includes an additional bit to specify a number of transmitters transmitting; or
a formula $-10 \log_{10} N$, N=1, 2, 3, 4 for a 4 transmitter antenna, wherein the format message further includes an additional two bits to specify a number of transmitters transmitting; and
prepare the format message based on the power scaling factor, wherein the format message includes designation bits to specify a transmission mode of a plurality of transmission modes, wherein the plurality of transmission modes comprises multiple user-MIMO, closed loop Rank-1, and closed loop Rank-2; and a transmitter configured to transmit the format message periodically over one or more spatial beam transmissions, wherein the format message includes specifying the value of the power scaling factor; and wherein the access node is configured to dynamically adjust the power of the transmission signal to the receiver based on the power scaling factor without creating interference with other transmissions on the network.

10. The system of claim 9, wherein the designation bit format message further specifies a dB rating to be applied to the transmission signal.

11. The method of claim 1, wherein the format message further includes designation bits further specifying a dB rating to be applied to the transmission signal.

12. The system of claim 6, wherein the format message further includes designation bits further specifying a dB rating to be applied to the transmission signal.

13. The method of claim 4, wherein the access node comprises two transmitters, wherein the transmitters perform the transmitting.

14. The method of claim 4, wherein the access node comprises four transmitters, wherein the transmitters perform the transmitting.

15. The system of claim 9, wherein the transmitter is a first transmitter, wherein the access node further comprises a second transmitter.

16. The system of claim 9, wherein the transmitter is a first transmitter, wherein the access node further comprises an additional three transmitters.

* * * * *